United States Patent [19]
Graham et al.

[11] Patent Number: 5,749,339
[45] Date of Patent: May 12, 1998

[54] ELECTRONICALLY CONTROLLED CONTINUOUS LUBRICATING OIL REPLACEMENT SYSTEM

[75] Inventors: John P. Graham, Columbus, Ind.; Jerry C. Wang, Waterloo, Iowa; Leslie A. Roettgen, Columbus; Donald P. Carver, Henryville, both of Ind.; Colin I. Black, Wadmalaw Island, S.C.; David M. Stehouwer, Cookeville, Tenn.; Ray C. Hatton, Columbus, Ind.

[73] Assignee: Cummins Engine Company, Inc., Columbus, Ind.

[21] Appl. No.: 608,305

[22] Filed: Feb. 28, 1996

[51] Int. Cl.$^6$ .................................................. F02B 33/04
[52] U.S. Cl. .................................................. 123/73 AD
[58] Field of Search ........................ 123/73 AD, 196 R, 123/196 S, 381

[56] References Cited

U.S. PATENT DOCUMENTS

| | | |
|---|---|---|
| 3,447,636 | 6/1969 | Bonfilio . |
| 4,417,561 | 11/1983 | Yasuhara . |
| 4,421,078 | 12/1983 | Hurner . |
| 4,495,909 | 1/1985 | Hurner . |
| 4,506,337 | 3/1985 | Yasuhara . |
| 4,632,085 | 12/1986 | Misawa et al. .......... 123/73 AD |
| 4,638,771 | 1/1987 | Mori ...................... 123/73 AD |
| 4,674,456 | 6/1987 | Merritt . |
| 4,726,330 | 2/1988 | Shiga ..................... 123/73 AD |
| 4,869,346 | 9/1989 | Nelson . |
| 5,370,089 | 12/1994 | Harada .................. 123/73 AD |
| 5,390,762 | 2/1995 | Nelson . |
| 5,431,138 | 7/1995 | Hurner . |
| 5,511,524 | 4/1996 | Kidera et al. ............ 123/73 AD |
| 5,522,370 | 6/1996 | Katoh et al. ............ 123/73 AD |
| 5,586,538 | 12/1996 | Barnes .................... 123/381 |

FOREIGN PATENT DOCUMENTS

| | | |
|---|---|---|
| 0684368A1 | 5/1995 | European Pat. Off. . |
| 56-047615 | 4/1981 | Japan . |
| 720222 | 12/1954 | United Kingdom . |
| 867711 | 5/1961 | United Kingdom . |
| 1454184 | 10/1976 | United Kingdom . |

OTHER PUBLICATIONS

Product description entitled "Circulating Engine Oil Supply Systems With Oil/Fuel Blending and Automatic Fill Control for Engines on Heavy Equipment" by Reserve Systems, Inc.

*Primary Examiner*—Marguerite McMahon
*Attorney, Agent, or Firm*—Sixbey, Friedman, Leedom & Ferguson; Charles M. Leedom, Jr.; Tim Brackett, Jr.

[57] ABSTRACT

An improved method and system for automatically continuously replacing an engine's used lubricating oil with fresh lubricating oil throughout operation based on engine operating conditions is disclosed. The present system includes an injection control device for injecting small amounts of used lube oil into the engine's fuel system and an auxiliary flow control device for directing controlled quantities of fresh oil into the engine's lube oil system. An electronic controller is provided to vary the amount of used lube oil injected into the oil system based on the severity of engine operation. The process periodically determines an engine operating severity value, i.e. fuel consumption value, for an interval of engine operation and calculates a base line quantity of oil for injection based on the current fuel consumption of the engine during the current interval. The system also includes a diagnostic process for maintaining the engine's oil sump at a proper level while monitoring various components and parameters of the system and providing an indication of any abnormal condition. The system maintains the quality of the engine lube oil at a level necessary to provide optimal engine protection at all engine operating conditions while also maintaining the oil concentration in the engine's fuel at an acceptable level.

32 Claims, 6 Drawing Sheets

ELECTRONICALLY CONTROLLED CONTINUOUS LUBRICATING OIL REPLACEMENT SYSTEM

TECHNICAL FIELD

This invention relates to an improved system for automatically, continuously replacing an engine's used lubricating oil with fresh lubricating oil throughout engine operation based on engine operating conditions.

BACKGROUND OF THE INVENTION

It is highly desirable to be able to minimize the amount of service required for internal combustion engines to thereby minimize the interruption in the use of the vehicle/equipment. Degradation and contamination of engine lubricating oil during engine use requires oil changing procedures which account for a significant portion of the maintenance and associated engine "down time". Conventional periodic oil changes generate an accumulation of waste lubricating oil which must be disposed of and/or processed resulting in undesirable costs. Therefore, extending oil drain intervals and reducing waste disposal are of great value to vehicle/equipment operators.

Consequently, systems have been developed for automatically changing internal combustion engine crankcase oil during engine operation. For example, U.S. Pat. No. 3,447,636 discloses a system for automatically changing engine oil while the engine is operating. The system operates to drain substantially all of the used oil from the engine immediately prior to introducing fresh oil into the engine from a reservoir. The single operation process results in a complete change of the substantially the entire engine oil volume. However, draining the engine prior to refilling with fresh oil necessarily creates a risk that an inadequate supply of lube oil exists in the engine for an interim time period possibly resulting in damage or excessive wear to engine components from insufficient lubrication. Moreover, this system undesirably results in a quantity of waste oil.

Other systems have been developed which automatically change engine lube oil during engine operation while avoiding a waste quantity of oil by directing the used lube oil into the fuel system for burning with the fuel in the engine. These systems periodically drain a small amount of the used oil from the engine lube oil system, and replace the drained quantity with fresh lubricant from an auxiliary tank. For example, U.S. Pat. Nos. 4,869,346 and 5,390,762 to Nelson disclose an automatic crankcase oil change and makeup system including a displacement unit having a piston with a predetermined stroke set to deliver identical, predetermined amounts of fresh oil during each stroke at the same flow rate and volume as the extraction of used oil. The frequency of the pressure strokes is set by a timer in an electronic controller, and is adjustably set to stroke at fixed time intervals to provide a cumulative quantity of fresh oil to the crankcase according to the regular recommended oil change period for the particular engine. A pair of dials on the controller enable the frequency of the pressure strokes to be adjusted. U.S. Pat. Nos. 4,421,078; 4,495,909; and 5,431,138 to Hurner disclose similar systems for oil changing and making up during engine operation which include a control module having an adjustable impulse timer set to periodically cycle an air pressure operated oil extractor pump at a fixed time intervals to direct a predetermined amount of engine oil out of the oil pan and into the fuel tank. Fresh makeup oil is pumped from an oil reservoir to the crankcase, also by air pressure, in response to a low level signal from a dipstick sensor. Similarly, U.S. Pat. No. 4,417,561 to Yasuhara discloses an automatic oil changing and disposing apparatus wherein used crankcase oil is periodically directed to a fuel tank via a valve controlled by an odometer switch, and fresh oil is gravity fed from a fresh oil tank to the crankcase via a control valve controlled by a crankcase oil level switch. The quantity of each increment of used oil removed from the crankcase, and each increment of fresh oil supplied, is controlled by respective timers having variable on-time duration to effect variable control of engine oil extraction and addition.

Although capable of automatically changing lube oil during engine operation, the automatic oil changing systems discussed hereinabove are incapable of accurately varying and controlling oil changing in response to the actual needs of the engine that vary based on the engine operating conditions, such as fuel consumption. The amount of oil drained from the crankcase and injected into the fuel system is often either less than the necessary replacement rate when the engine is being used more heavily than expected, or more than the optimum amount when the engine is being used less heavily than expected. Injecting too little used oil from the oil sump into the fuel system will disadvantageously result in engine damage from over-used oil incapable of adequately lubricating and cooling engine components. On the other hand, injecting too much oil results in excessive concentrations of used oil in the fuel resulting in engine performance degradation, increased emissions, shortened fuel filter life and wasted oil. In addition, if the engine is a recent emission regulated engine, injecting too much oil into the fuel system will result in emission non-compliance and possibly a fine. Although Yasuhara '561 suggests variable control of engine oil extraction and addition, this reference does not suggest means for accomplishing such variable control nor the engine operating parameters to be considered. The Nelson '346 and '762 references only suggest varying the amount of oil extracted and added to the engine crankcase by manually adjusting timers to vary the frequency of oil additions and extractions.

British application No. 867,711 discloses a system for creating a controlled injection of engine lubricating oil into the engine's fuel system. The amount of oil added to the fuel system may be controlled in dependence on engine load in a first embodiment or engine speed in a second embodiment. In both embodiments, oil is injected into the fuel system via a groove formed in a fuel injection pump plunger. In the first embodiment, the annular groove is shaped with a varying cross-section. The plunger is rotated based on engine load to vary the flow area of the groove thereby varying the amount of injected oil. In the second embodiment, oil injection is controlled based on engine speed by varying the oil pressure in the suction chamber. A fuel passage containing a throttle orifice connects the fuel supply pump to the suction chamber. As the volume of fuel injected increases, the pressure in the suction chamber decreases which draws a larger quantity of oil into the chamber. However, each embodiment of this system is incapable of controlling oil injection based on more than one engine condition. As a result, each embodiment of this system is incapable of effectively varying the rate of oil injection to maintain the proper quality of lube oil in the sump while also ensuring an acceptable concentration of oil in the fuel. In addition, this system does not provide an automatic means for replacing the engine'oil sump. Also, since this system requires modifications to an engine'fuel pump, this system may not be easily retrofit on existing engines.

U.S. Pat. No. 4,674,456 to Merritt discloses a system for effecting periodic partial replacement of used oil with fresh oil. A first container holds fresh oil, a second container holds used oil, and separate respective pumps transfer fresh oil to the engine and remove used oil. In operation, fresh oil approximating the total capacity of the crankcase or oil reservoir is poured into the first container. In the example provided by Merritt, if the manufacturer recommends that five quarts of oil be replaced every 3000 miles, the system is programmed to remove one quart of used oil after 600 miles. The controlling means senses the engine running time or the miles driven and activates the respective pumps at each running time or mileage interval. Fresh oil is added at a substantially equal rate to the rate of oil removal from the crankcase to maintain a constant amount of oil within the oil reservoir of the engine. The controlling means may receive a modifying input signal from a thermocouple measuring engine temperature to increase the rate of oil replacement if above-average engine temperature is measured. However, varying the amount of predetermined oil replacement based merely on variations in the engine operating temperature does not result in the optimum lube quality throughout engine operation. Moreover, this system does not provide any means for compensating for oil burned in, or inadvertently leaked from, the engine. In addition, this system does not direct used oil into the engine' fuel system and, therefore, undesirably results in a quantity of waste oil which must be disposed of or processed.

U.S. Pat. No. 4,506,337 to Yasuhara is noted for disclosing an engine lube oil replacement timing monitoring system comprising a microcomputer which calculates the amount of soot suspended in the lube oil on the basis of engine speed and engine load whereby the expired life of the engine oil can be accurately detected so as to permit oil changing. The microcomputer operates an indicator alerting the operator of the need to change the oil. Thus, instead of automatically changing the oil during engine operation, this system disadvantageously requires the engine to be shut down prior to changing the oil and inevitably produces a quantity of waste oil which must be disposed of. In addition, this system fails to consider other critical engine operating conditions and parameters and, therefore, does not determine the optimum time interval between oil changes nor maintain the quality of the oil at an optimum level throughout engine operation.

Therefore, there is a need for a continuous engine lube oil replacement system capable of more effectively controlling the quantity of used lube oil burned in the engine based on varying engine operating conditions.

SUMMARY OF THE INVENTION

It is an object of the present invention, therefore, to overcome the disadvantages of the prior art and to provide a continuous lube oil replacement for an engine capable of reliably, accurately and effectively controlling the rate at which lube oil is replaced in the engine's lube oil system.

It is another object of the present invention to provide a continuous oil replacement system capable of burning only the optimal quantity of lube oil in the engine's fuel system.

It is yet another object of the present invention to provide a continuous oil replacement system which eliminates oil changes so as to minimize engine down time.

It is a further object of the present invention to provide a continuous oil replacement system which accurately and effectively maintains the oil concentration in the engine's fuel system at a level necessary to maintain emissions compliance.

It is a still further object of the present invention to provide a continuous oil replacement system which maintains the quality of the engine lube oil at a level necessary to provide optimal engine protection.

Still another object of the present invention is to provide an electronically controlled continuous oil replacement system capable of optimally controlling the amount of waste oil directed into the engine's fuel system based on varying engine operating conditions to achieve optimum engine lubrication at reduced costs during all engine operating conditions.

Another object of the present invention is to provide an electronically controlled continuous oil replacement system which continuously monitors and maintains the engine lube oil sump at the proper level thereby eliminating the costs and risks associated with manual inspections by the vehicle operator.

Yet another object of the present invention is to provide an electronically controlled continuous oil replacement system which eliminates the need to dispose of used engine oil.

Still another object of the present invention is to provide an electronically controlled continuous oil replacement system which avoids excessive engine oil consumption under light engine loads and unacceptable oil contamination under heavy engine loads.

Another object of the present invention is to provide an inexpensive electronically controlled continuous oil replacement system which can be easily retrofit on existing engines and integrated into new engines.

Still another object of the present invention is to provide an electronically controlled continuous oil replacement system which automatically continuously monitors various components and parameters of the engine lube oil system and the oil replacement system and provides warning indications of any abnormal conditions.

It is a further object of the present invention to provide an electronically controlled continuous oil replacement system which accurately and effectively maintains the oil concentration in the engine's fuel system at a level necessary to maintain sulfur concentration in the fuel at an acceptable level.

These and other objects are achieved by providing an electronically controlled lube oil replacement system for an engine capable of consuming fuel, comprising an engine lube oil supply including a lube oil supply circuit for delivering a supply of lube oil to the engine, a lube oil injection circuit connected to the lube oil supply circuit for permitting an injection flow of lube oil from the lube oil supply circuit, an engine lube oil injection control device positioned along the lube oil injection circuit for controlling the injection flow of lube oil to define a lube oil injection rate, an engine operating condition detecting device for detecting at least one operating condition and generating an engine operating condition signal indicative of the engine operating condition or mode, and a processor for receiving the engine operating condition signal, calculating a engine operating severity value based on the engine condition signal and generating an injection flow control signal based on the engine operating severity value, wherein the injection flow control signal controls the operation of the injection control device to variably control the injection rate. The engine operating severity value may be a fuel consumption value corresponding to the engine fuel consumption rate or total quantity for a current interval. The lube oil injection circuit may be connected to a fuel supply system for injecting lube oil into the fuel supply system for burning. The replacement system may also include an auxiliary lube oil supply including an auxiliary lube oil supply circuit for providing an auxiliary supply flow of lube oil to the main lube oil supply and an auxiliary lube oil tank containing a supply of auxiliary lube oil. The present replacement system may also include an auxiliary lube oil flow control device positioned along the auxiliary lube oil supply circuit for controlling the auxiliary supply flow of clean lube oil to the engine lube oil supply to define an auxiliary supply flow rate. The processing means may generate a flow control signal for controlling the operation of the auxiliary lube oil flow control device so as to variably control the auxiliary supply flow rate. The engine lube oil supply may include a lube oil sump containing an accumulated supply of lube oil while the auxiliary lube oil may include an auxiliary lube oil tank. The auxiliary lube oil supply circuit may connect the auxiliary lube oil tank to the lube oil sump for delivering an auxiliary supply flow to the main sump. A lube oil sump level sensor may also be provided to detect the oil level in the sump and generate a corresponding level signal. The processing means may receive the level signal and generate an auxiliary control signal for controlling the operation of the auxiliary supply flow control device to maintain the sump oil level at an acceptable level. The engine lube oil injection control device may include an injection pump intermittingly operated to pump a predetermined quantity of lube oil into the fuel supply system. The auxiliary flow control device may include a similar injection pump for directing predetermined quantities of auxiliary lube oil into the sump. An electronic control module may be provided for controlling engine operation and providing the engine condition signal to the processing means. The engine condition signal may be an integrated fuel consumption rate with respect to time, or an alternative value. The processor may be an electronic controller including an input for receiving the engine condition signal and an output for providing the injection flow control signal. The processor may calculate a fuel consumption value based on the engine condition signal, process the fuel consumption value to determine the quantity of oil to be injected, generate an output signal based on the quantity oil to be injected and provide the output signal to the output. The electronic controller may further include an engine configuration storage device connected with the processor for storing engine configuration information. The processor may process the fuel consumption by accessing the engine configuration storage device and retrieving an oil change value corresponding to the quantity of oil to be injected into the fuel system based on the fuel consumption value.

In the method of the present invention, the quantity of oil to be injected is determined at periodic intervals throughout engine operation based on a predetermined time variable or a predetermined mileage variable or combination thereof. The injection control device is capable of injecting a predetermined unit injection quantity upon receipt of the output signal so that the timing of injection of the predetermined unit injection quantity during engine operation is dependent on the fuel consumption value. The method may also include the step of adding the quantities of oil to be injected for a plurality of periodic intervals to define a cumulated oil quantity to be injected. The cumulated quantity of oil to be injected may then be compared to the predetermined unit injection quantity. The output signal is provided to the injection control device when the cumulated oil quantity to be injected is greater than the predetermined unit injection quantity. The method may also include the step of detecting oil temperature, generating a temperature signal indicative of the oil temperature and adjusting the quantity of oil to be injected based on the temperature signal. A step may also be included for accessing from a soot information storage device to retrieve a soot value. The quantity of oil is then adjusted based on the soot value. The method may also include the step of adjusting the quantity of oil to be injected based on a quality characteristic of the lube oil.

The present lube oil replacement system also includes a diagnostic system and method for determining an engine sump oil level and providing a first control signal to the auxiliary flow control device to inject a first quantity of auxiliary oil from the auxiliary lube oil tank to the engine sump when the engine sump oil level is below an acceptable level. The diagnostic method may include the step of redetermining the engine sump oil level after injection with the first quantity of auxiliary oil determining an auxiliary oil level in the auxiliary oil tank when the engine sump level is unacceptable and generating a fault signal for alerting an operator when the auxiliary oil tank level is low. Moreover, this method may include the step of determining whether the auxiliary flow control device is functioning properly when the engine sump oil level is higher than an acceptable level and generating a fault signal for alerting an operator when the auxiliary flow control device is functioning improperly. The method may also include the step of checking the proper functioning of the flow control device after determining the auxiliary oil level in the auxiliary oil tank.

DETAILED DESCRIPTION OF THE INVENTION

Figure 1:
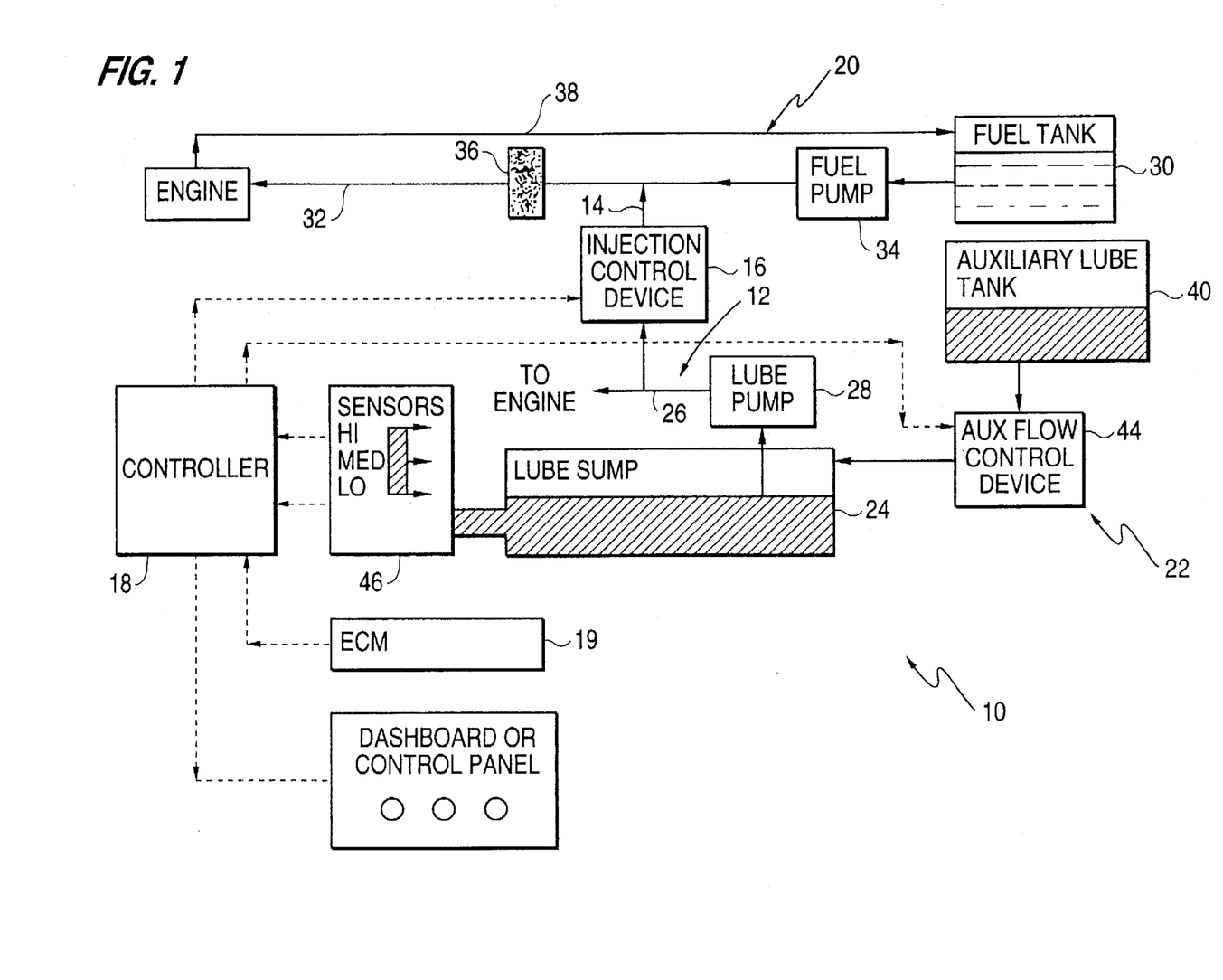
FIG. 1 a schematic diagram of the continuous lube oil replacement system of the present invention.

Referring to FIG. 1, the continuous lube oil replacement system of the present invention indicated generally at 10 includes an engine lube oil supply system 12 for supplying lubricating fluid or oil to an engine for lubricating and cooling engine components, a lube oil injection circuit 14 for draining small quantities of used lube oil from the engine lube oil circuit, an injection control or metering device 16 positioned along the lube oil injection circuit 14 for controlling the injection rate of lube oil from the engine lube oil supply circuit and a controller 18 for determining an optimum injection rate of lube oil in response to engine operating conditions and controlling injection control device 16 to achieve the optimum injection rate. The continuous lube oil replacement system 10 may be used to inject the lube oil into an engine fuel system, indicated generally at 20, for mixing and burning with the fuel in the engine'S combustion chamber. Oil replacement system 10 also preferably includes an auxiliary lube oil supply system indicated generally at 22 for supplying new lube oil to the lube oil supply circuit. The present oil replacement system 10 advantageously removes predetermined quantities of used oil from the engine lube oil system 12 throughout the operation of the engine based on specific engine characteristics and operating conditions to create an optimum drain or injection rate while supplying controlled quantities of new oil to engine lube oil system 12. As a result, the present system maintains the lube oil concentration in the fuel below a predetermined level necessary to maintain emissions within acceptable limits while also maintaining the lube oil in the engine lube oil system 12 at a quality necessary to achieve optimum engine lubrication and cooling throughout extended periods of engine operation without incurring the down-time and costs associated with complete one-time engine lube oil replacement.

The engine lube oil supply system 12 includes an engine lube oil crankcase or sump 24, a lube oil supply circuit 26 for delivering lube oil to the engine and a lube oil pump 28 positioned along supply circuit 26 for drawing lube oil from sump 24 and providing a pressurized flow of lube oil to the engine. Throughout operation of the engine, lube oil is delivered to the engine for lubricating and cooling various engine components and then returned to oil sump 24. Without proper lube oil replacement or replacement, the ability of the oil to lubricate and cool gradually decreases during use due to oil degradation and contamination. The present system provides optimal oil replacement to maintain the quality of the lube oil while also maintaining emissions fuel sulfur content within acceptable limits.

The lube oil injection circuit 14 connects at one end to engine lube oil supply circuit 26 downstream of lube oil pump 28 and at an opposite end to the engine fuel system 20. Engine fuel system 20 may be any conventional engine fuel system for delivering fuel to the engine. For example, as shown in FIG. 1, fuel system 20 includes a fuel tank 30 and a fuel supply circuit 32 connecting fuel tank 30 to the engine. Fuel system 20 further includes a fuel pump 34 positioned along fuel supply circuit 32 and a fuel filter 36 positioned between pump 34 and the engine. A fuel return line 38 returns unused fuel from the engine to fuel tank 30. Lube oil injection circuit 14 preferably connects to fuel system 20 along fuel supply circuit 32 between fuel pump 34 and fuel filter 36. However, alternatively, injection circuit 14 may be connected to fuel return line 38, the fuel tank 30 or to fuel supply circuit 32 immediately upstream of fuel pump 34, i.e. fuel pump inlet. It has been found that directing the lube oil into the fuel pump inlet provides improved mixing of the fuel and lube oil while also enhancing lubrication of fuel pump 34. Lube oil injection control or metering device 16 is positioned along lube oil injection circuit 14 to control the injection of lube oil from sump 24 and injection into fuel supply circuit 32. Lube oil control device 16 is preferably the solenoid-operated piston type disclosed in U.S. Pat. Nos. 4,421,078 and 4,495,909, which are hereby incorporated by reference, wherein a cylinder contains a movable piston defining opposed chambers. One chamber receives lube oil from the lube oil supply circuit 26 via a solenoid valve while the opposite chamber communicates with a pressurized driving fluid via a respective solenoid. The oil delivered from circuit 26 into the chamber is pumped into fuel system 20 as the piston moves in response to a pressurized driving fluid entering the opposite chamber. The driving fluid may be pressurized air or the lube oil from the engine lube oil supply system. Each time lube oil control device 16 is operated, as dictated by controller 18, the solenoid valves of control device 16 are actuated to control the flow of lube oil and driving fluid in a manner to inject a predetermined amount of lube oil from one chamber into fuel system 20. The amount of lube oil injected during each actuation of injection control device 16 is determined by the size of the chamber and the fixed stroke of the piston. Preferably, the volume of the chamber, and therefore the volume of lube oil injected, is relatively small, for example, one ounce. By injecting small quantities of lube oil periodically over the operation period of the engine, the present system is more capable of precisely controlling the concentration of lube oil in the fuel so as to maintain emissions within acceptable limits throughout engine operation.

Of course, lube oil control device 16 may be any metering or pumping device capable of being selectively operated to inject a precise quantity of lube oil. For example, lube oil control device 16 may be a solenoid operated two-way valve movable between open and closed positions. A flow restriction orifice is preferably incorporated in the control valve or provided immediately downstream to limit the quantity of lube oil per unit time. The amount of lube oil injected is therefore is determined primarily by the amount of time the solenoid valve remains in the open position and secondarily by the lube oil pressure. Therefore, instead of delivering a fixed quantity of lube oil during each actuation as does the solenoid operated piston pump previously discussed, the solenoid valve of this embodiment could be actuated and held in the open position for a period of time necessary to inject any desired predetermined amount of lube oil. Alternatively, lube oil control device 16 may be of the type disclosed in U.S. Pat. No. 5,431,138.

Auxiliary lube oil supply system 22 includes an auxiliary lube oil tank 40 containing a reserve or auxiliary supply of lube oil and an auxiliary lube oil supply circuit 42 fluidically connecting tank 40 to lube oil sump 24. The system 22 further includes an auxiliary lube oil supply flow control or metering device 44 positioned along auxiliary supply circuit 42 for controlling the flow of auxiliary oil to sump 24. Lube oil supply control device 44 is preferably the same type of solenoid operated piston pump as injection control device 16 described hereinabove. Upon receipt of an actuation signal from controller 18, auxiliary lube oil flow control device 44 operates to inject a fixed quantity of lube oil. Of course, like injection control device 16, auxiliary oil flow control device 44 may alternatively be a solenoid-operated two-way valve capable of injecting variable quantities of lube oil as described hereinabove. The lube oil level in sump 24 is monitored during engine operation via sensors mounted in a sensing chamber 46 mounted external, but fluidically connected to, sump 24. When the oil level in sump 24 reaches a predetermined level below the normal operating level, controller 18, which receives level signals from the level sensors, actuates auxiliary lube oil flow control device 44 to inject auxiliary lube oil so as to maintain a predetermined level in sump 24. Alternatively, a float-type device may be used in combination with a gravity drain version of the present system. In this embodiment, auxiliary tank 40 must be positioned above sump 24 and a valve positioned in the auxiliary supply circuit 42 is controlled by the float-type device such that the valve is opened when the oil level in sump 24 is low and closed when the oil level reaches an acceptable predetermined level.

Alternatively, the system may be designed to detect sump oil level only prior to each engine start-up, when the level can be accurately detected, instead of continuously or intermittently throughout engine operation. In over-the-road vehicles applications, the sump oil level may be difficult to accurately detect due to churning of the oil by the engine crankshaft and vehicle movement. By only detecting sump level during engine shut-down, an accurate sump level can be detected. If the sump level is below an acceptable level, than the auxiliary flow control device can be operated to add the necessary amount of oil to the sump.

In an alternative embodiment, the auxiliary system may include a dual function flow control device which in a single operation injects the same amount of fresh oil into sump 24 and used oil from the sump into the fuel system. The dual function flow control device may, for example, be similar to that disclosed in U.S. Pat. No. 4,869,346. Thus, when the system of the present invention signals the dual function flow control device to inject a quantity of used lube oil into the fuel system, the flow control device will operate to remove a unit injection quantity from the sump while delivering an identical quantity of fresh oil to the sump. Since the oil level in sump may fall below a predetermined level due to oil leakage from the engine or gradual oil burning in the engine, this embodiment may include an automatic used oil recirculation system. If the sump level is substantially below the predetermined level, then at least a portion of the quantity of used oil to be injected is returned to the sump until an acceptable level is reached.

Figure 2:
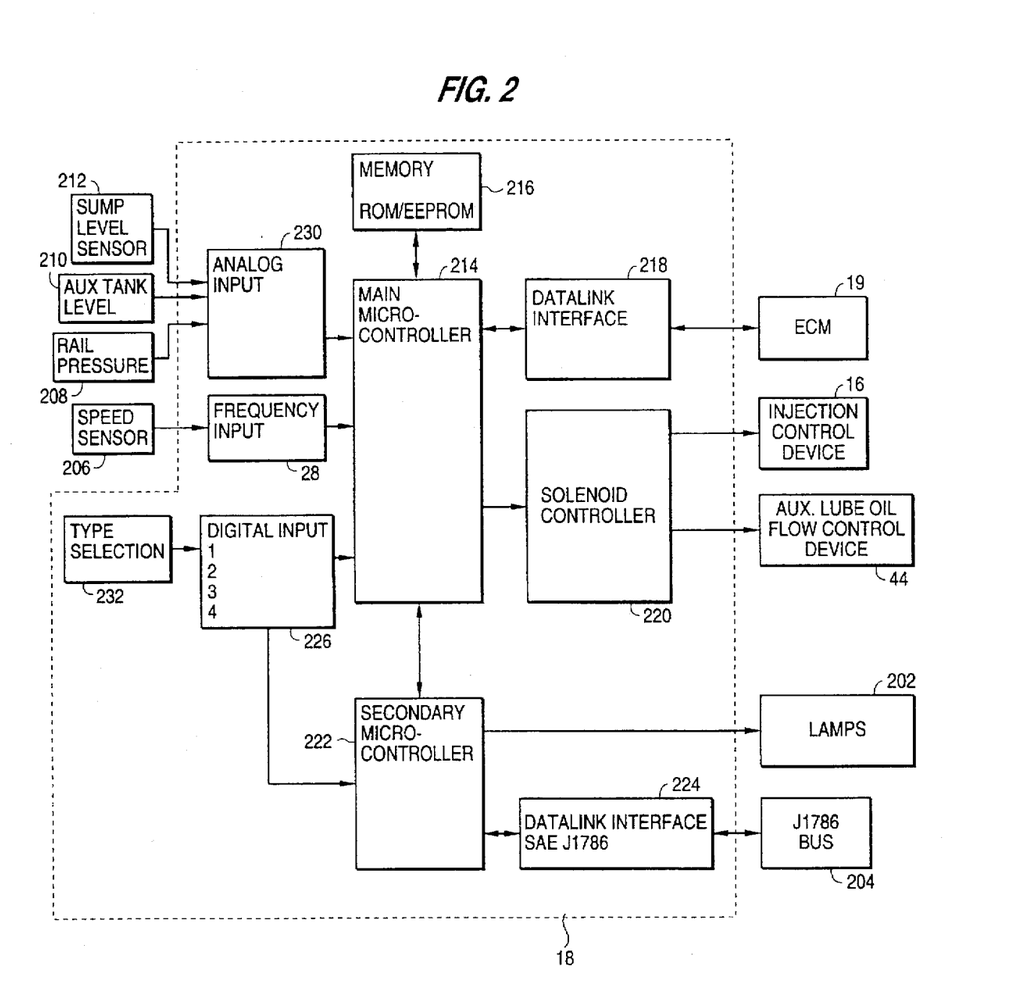
FIG. 2 is a schematic block diagram of a controller for use with the oil replacement system of the present invention.

FIG. 2 is a block schematic diagram of the control and operating circuitry of continuous oil replacement system 10. This circuitry may comprise the controller 18, injection control device 16, electronic control module 19, auxiliary lube oil flow control device 44, status indication lamps 202, J1786 bus 204, speed sensor 206, rail pressure sensor 208, auxiliary tank level sensor 210, and sump level sensor 212.

Controller 18 comprises main microcontroller 214, memory 216, datalink interface 218, solenoid controller 220, secondary microcontroller 222, SAE J1783 datalink interface 224, digital input 226, frequency input 228, analog input 230, and engine type selection switches 232.

As shown in FIG. 2, main microcontroller 214 is connected to memory 216, which is preferably an EEPROM containing a control program, initial setup data, and operating tables used by main microcontroller 214. The control program, data, and operating tables implement novel control algorithms which will be described in more detail below with reference to FIGS. 3–5.

Main microcontroller 214 has input ports connected to receive information from analog input 230, frequency input 228, and digital input 226. Main microcontroller 214 also has an input/output port connected to datalink interface 218 and an output port connected to solenoid controller 220. Main microcontroller 214 is further connected via a data bus to secondary microcontroller 222 which has input ports connected to digital input 226, output ports connected to signal lamps 202, and an input/output port connected to SAE J1783 datalink interface 224.

Solenoid controller 220 is connected to selectively actuate solenoids of injection control device 16 and auxiliary lube oil flow control device 44 under control of the program in main microcontroller 214. Solenoid controller 220 is a solenoid control circuit which receives a digital control signal from main microcontroller 214 and provides a high-current output to actuate the connected solenoids. Injection control device 16, when actuated under the control of main microcontroller 214, diverts oil from circuit 26 of the engine's lubricating oil system (shown in FIG. 1) to engine fuel system 20 (also shown in FIG. 1). Auxiliary lube oil flow control device 44, when actuated, transfers lubricating oil from auxiliary lube tank 40 (shown in FIG. 1) to lube sump 24 (also shown in FIG. 1).

As will be seen, the operating program of main microcontroller 214 uses engine operating condition inputs, such as fuel consumption, or speed and rail pressure inputs, to determine a fuel consumption value and, in real time, an appropriate rate of lubricating oil burning and replacement based on current operating conditions. Injection control device 16 and auxiliary lube oil flow control device 44 are controlled to provide the desired rates of lubricating oil burning and replacement.

FIG. 2 shows three different sets of connections for obtaining the needed fuel consumption information, but it will be understood that only one source of this information is needed. The inputs may be obtained from dedicated speed sensor 206 and rail pressure sensor 208 shown in FIG. 2.

These inputs are preferred in cases where there is no electronic control module 19 or SAE J1786 bus 204 on the engine.

However, a conventional ECM for controlling injection metering for an electronic fuel injection system possesses the required fuel consumption information, i.e. instantaneous fuel consumption rate. Thus, in engines having an ECM 19, the ECM 19 will typically directly provide the required fuel consumption information. The fuel consumption information can be transmitted to main microcontroller 214 through datalink interface 218. Datalink interface 218 may be a serial bidirectional digital interface compatible with electronic control module 19, and may receive sensor or fuel consumption information and report the status of controller 18 and continuous oil replacement system 10 to ECM 19. In the case where ECM 19 is provided and ECM 19 provides the necessary fuel consumption information, it is not necessary to provide continuous oil replacement system 10 with a separate, dedicated speed sensor 206 and rail pressure sensor 208.

As a further alternative, the necessary engine operating information (speed and rail pressure), used to calculate the fuel consumption value, can be obtained by monitoring data transmissions on an SAE J1786 bus 204 if the engine is so equipped. In this case, controller 18 can operate using existing engine sensors and by communicating over SAE J1786 bus 204. Datalink interface 224 is a serial bidirectional interface compatible with the SAE J1786 bus standard. Secondary microcontroller 222 receives data packets through datalink interface 224 containing the desired speed and rail pressure information, and may transmit status information for continuous oil replacement system 10 over bus 204. Speed sensor 206, rail pressure sensor 208, and datalink interface 218 may all be omitted in this embodiment if the necessary data reception and status reporting functions can be performed over bus 204.

Engine type selection switches 232 may be DIP switches, jumpers, or other switch devices allowing an installer to configure the controller 18 for operation with one of a plurality of engines. The settings of engine type selection switches 232 are read by main microcontroller 214 through digital input 226 during startup, and these settings may then be used to select operating programs, data tables, sensor information input sources, and methods of information output, depending on the configuration of the engine and its electronic systems.

Analog input 230 is an analog-to-digital converter which provides main microcontroller 214 with a digital representation of the output signal level produced by analog sensors, such as the pressure and level sensors shown. Sump level sensor 212 and auxiliary tank level sensor 210 preferably provide a DC voltage output which varies with the respective oil levels monitored by these sensors. Rail pressure sensor similarly provides a DC voltage output varying with fuel injection rail pressure.

Frequency input 228 is a frequency counter which provides a digital representation of the frequency of a pulsed signal, such as the output of speed sensor 206 which may be, for example, a Hall-effect or optical sensor attached to a rotating engine shaft to produce a pulsed output signal, the frequency of which varies with engine speed.

Secondary microcontroller 222 is a microcontroller comprising RAM and ROM memory, input and output ports, and an operating program. The operating program receives digital inputs from engine type selection switches 232 and a digital control signal from main microcontroller 214. Based on these signals, secondary microcontroller 222 provides an output signal to control status indication lamps 202 in a manner which will be described in more detail below. In addition, secondary microcontroller controls datalink interface 224, transmitting information received from main microcontroller 214 over bus 204 and providing engine operating parameter information received over bus 204 to main microcontroller 214. Thus, secondary microcontroller 222 performs input and output processing functions to offload duties from main microcontroller 214.

Having discussed the structure of the continuous oil replacement system according to the present invention, the method used by the system to ensure proper engine oil replacement will now be discussed in more detail. Specifically, the most preferred embodiment of the present invention includes two fundamental processes - a first oil injection process for calculating the quantity of oil to be injected into the fuel system of the internal combustion engine based on the severity of engine operation as indicated by, for example, current fuel consumption, and for controlling the timing of the injection of such oil into the fuel system; and a second diagnostic process for monitoring the amount of available oil in lube sump 24, for replacing such amount from auxiliary oil tank 40 when necessary and for providing external indications of the condition of the oil replacement system to an operator of a vehicle.

As discussed above, in the most preferred embodiment of the present invention, both the oil injection process and the diagnostic process will be implemented in software contained in an oil replacement electronic control module, or controller 18, that includes a central processing unit such as a micro-controller, micro-processor, or other suitable microcomputing unit. The controller 18 receives appropriate inputs from the oil replacement system and from the internal combustion engine, and processes these inputs to determine the timing and quantity of oil injection and the appropriate oil replacement and diagnostic services.

Figure 3:
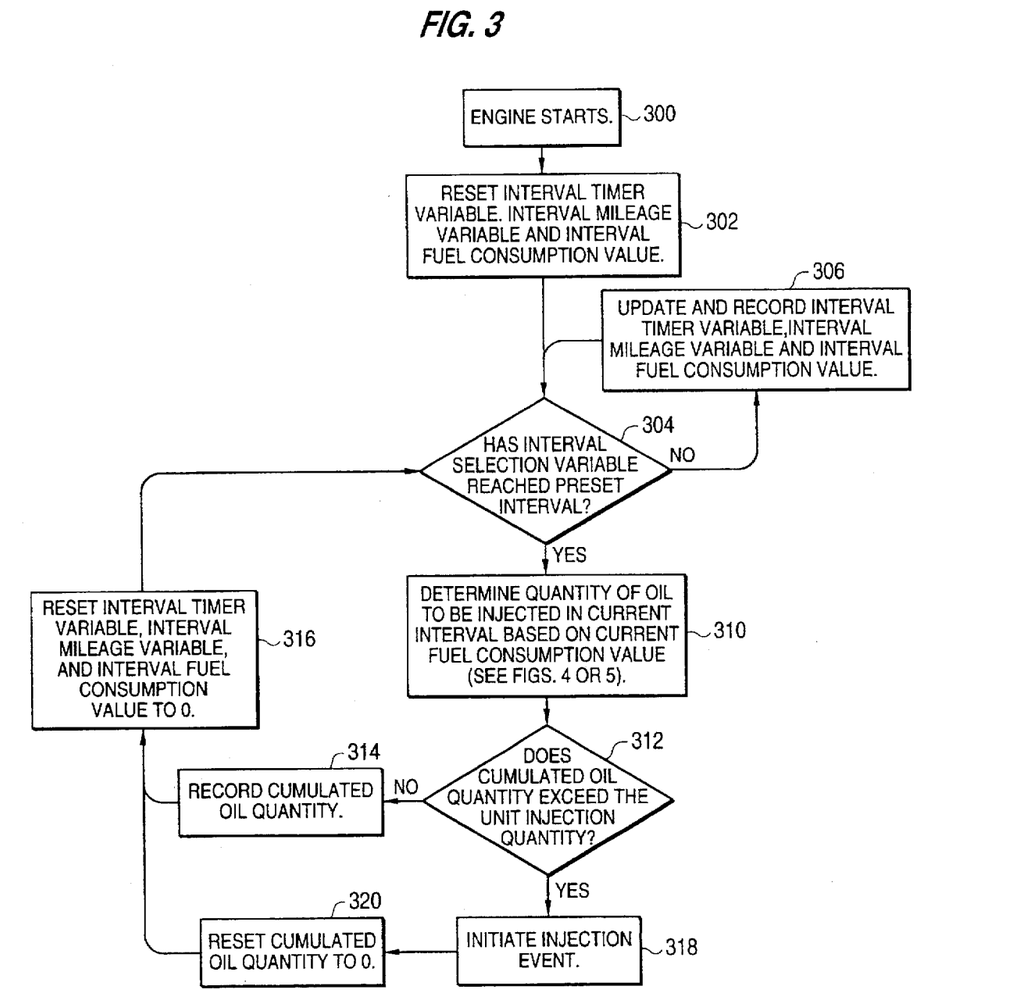
FIG. 3 is a flowchart illustrating an oil injection process for calculating the quantity of oil to be injected into the fuel system of the internal combustion engine and controlling the timing of the injection of such oil into the fuel system in accordance with the present invention.

Referring first to FIG. 3, a flowchart illustrating an oil injection process for calculating the quantity of oil to be injected into the fuel system of the internal combustion engine and controlling the timing of the injection of such in accordance with the present invention is shown. As can be seen in FIG. 3, the process begins at block 300 when an internal combustion engine containing an oil replacement system in accordance with the present invention is started. Upon starting of the internal combustion engine, the oil replacement controller 18 will be initialized and the control program contained therein executed, beginning in block 302.

In block 302, the oil replacement controller 18 will reset an interval timer variable, an interval mileage variable, and an interval fuel consumption value which are preferably stored within the central processing unit of the controller 18. As described below, the interval timer and interval mileage variables are used to specify an interval period which limits the iterations of steps used to determine the quantity of oil to be injected into the fuel system. Once the interval period is reached, the injection process will then proceed to determine a base quantity of oil to be injected into the engine'fuel system during the specified interval period based on the fuel consumption value.

One of the interval timer variable and interval mileage variable are used as an interval selection variable to specify the interval period with the selection of which variable is to be used primarily dependent upon the application in which the internal combustion engine is being used. That is, if the engine is used in an application in which mileage is a primary factor affecting engine wear, such as in an over-the-road vehicle, then the interval mileage variable will be used to determine the interval period. Conversely, if the engine is used in an application in which time of operation is a primary factor affecting engine wear, such as in a heavy earth moving vehicle, marine application or generator set, then the interval timer variable will be used to determine the interval period.

The process next transfers control to decisional block 304, where it is determined if the interval selection variable (i.e. either the interval timer variable or interval mileage variable depending on the specific engine application) has reached a preset interval. If not, control passes to block 306 where the interval timer variable and/or the interval mileage variable are updated and recorded within the controller 18 along with the interval fuel consumption value. Control then again returns to block 304, thus forming an interval loop. The interval timer variable, interval mileage variable and interval fuel consumption value are updated based on the change in time, mileage and fuel consumption since the last iteration of the interval loop, thus resulting in a record of the cumulative amount of time and mileage in the current interval. In the most preferred embodiment of the present invention, cumulative totals for these variables are stored as well as a running history for each iteration of the interval loop. Also, during each pass through the interval loop, the current fuel consumption rate or fuel consumption quantity, as provided by ECM 19, is recorded.

Fundamentally, the interval loop acts to limit the iterations of steps used to determine the quantity of oil to be injected into the fuel system of the internal combustion engine. That is, due to the relatively small rate of injection of oil to the fuel system, it is only necessary to calculate the oil injection quantity on a periodic basis, approximately every minute. Thus, in the most preferred embodiment, the interval loop is structured so that the preset interval will be reached by the internal selection variable approximately every minute.

Also, the interval loop functions to determine and record the fuel consumption rate or fuel consumption amount for the current interval. Each time control passes to block 306, a fuel consumption value is determined. The fuel consumption value is preferably the instantaneous fuel consumption rate provided directly by ECM 19, as discussed hereinabove. Alternatively, if the engine is not provided with an ECM the instantaneous fuel consumption rate may be calculated, and then recorded, using engine speed and fuel rail pressure information received from the engine speed and pressure sensors discussed hereinabove. During each interval, the instantaneous fuel consumption values are averaged to obtain an average fuel consumption rate, or fuel consumption quantity, as applicable, for the interval. It should be understood that a fuel consumption value corresponding to the amount of fuel burned may be provided instead of a fuel consumption rate value. Preferably, an average fuel consumption rate is continuously calculated as each instantaneous fuel consumption rate is determined during the current interval.

Figure 4:
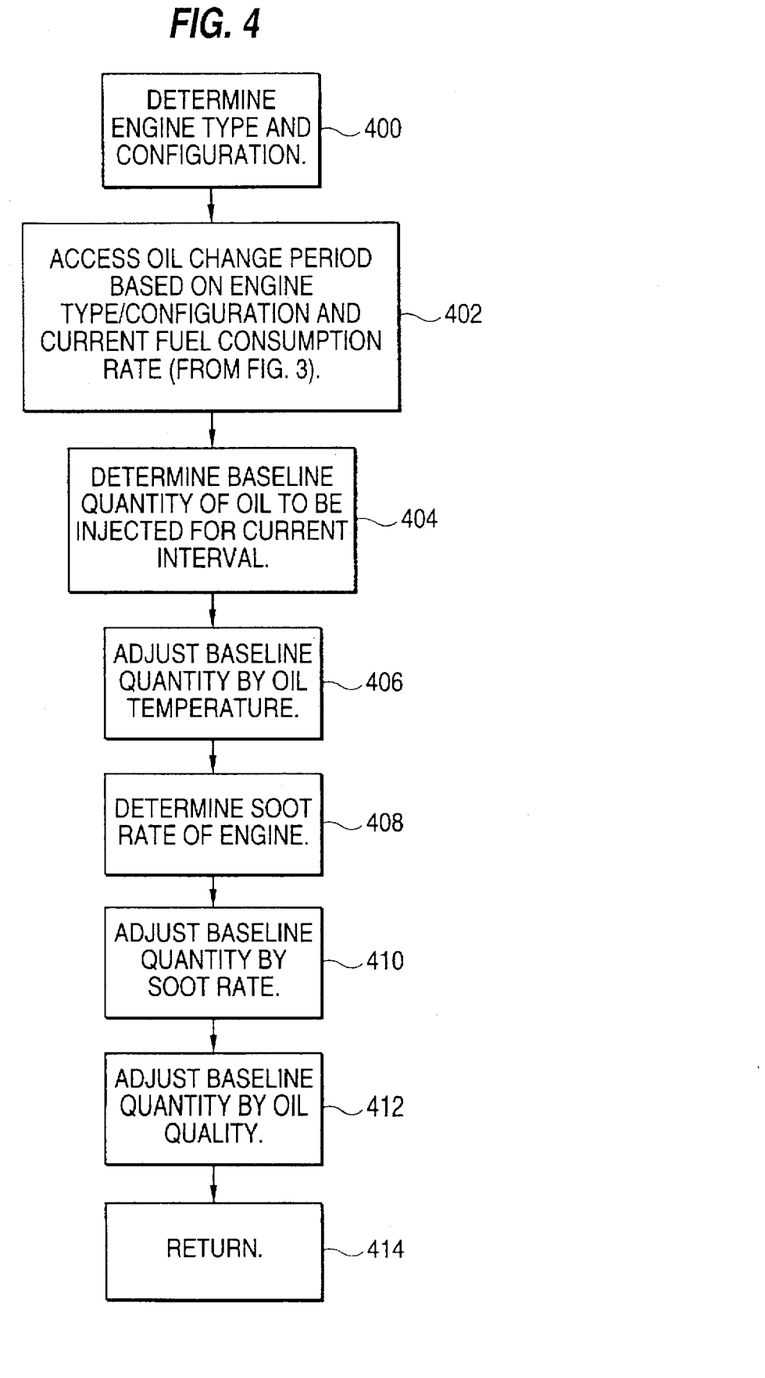
FIG. 4 is a flowchart illustrating in more detail the step of determining the oil quantity to be injected as shown in FIG. 3.
Figure 5:
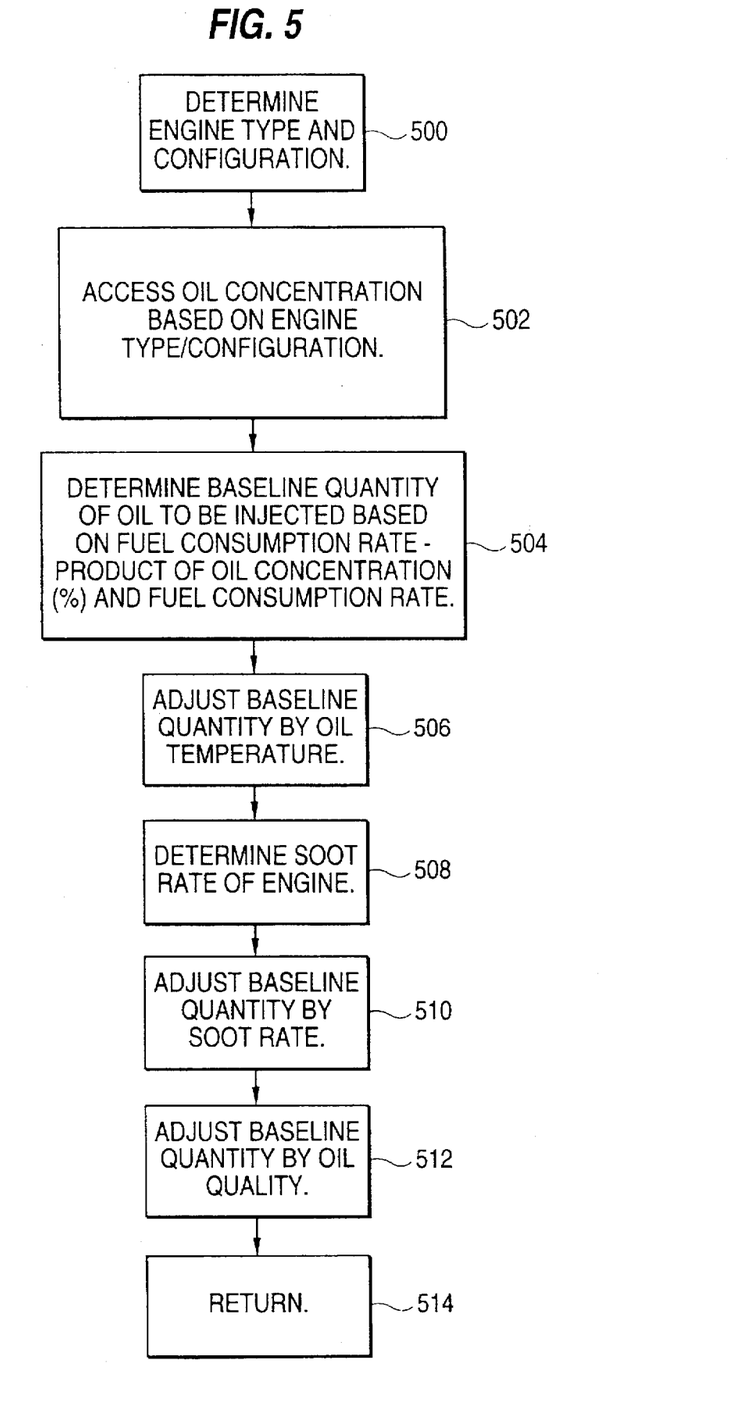
FIG. 5 is a flowchart illustrating a second embodiment of the process for determining the oil quantity to be injected.

Once the interval selection variable reaches the preset interval, control passes to block 310. In block 310, the system determines the quantity of oil to be injected into the fuel system during the current interval based on the fuel consumption value, i.e. fuel consumption rate. Importantly, the fuel consumption value is directly related to the operating severity of the internal combustion engine which determines the oil replacement needs of the engine. As indicated in block 310, this process of determining the quantity of oil to be injected during the current interval is discussed in more detail below in connection with the flowcharts shown in FIGS. 4 and 5. FIG. 4 illustrates the preferred process of determining the quantity of oil to be injected based on the current fuel consumption while FIG. 5 illustrates an alternative embodiment. Once the current amount of oil to be injected is determined, this current amount of oil is added to the total amount of oil to be injected from previous interval periods, if any, to result in a cumulated oil quantity to be injected. That is, the amount of oil to be injected for a certain number of interval periods is summed to form a cumulated oil quantity to be injected. As noted below, once this cumulated oil quantity exceeds a predetermined threshold, an injection event is initiated and the cumulated oil quantity reset.

More specifically, once the amount of oil to be injected is determined and added to the cumulated oil quantity, control passes to decisional block 312, where it is determined if the cumulated oil quantity to be injected exceeds a unit injection quantity. That is, in the most preferred embodiment as discussed above, lube oil injection control device 16, shown in FIG. 1, is configured to inject a constant amount of oil (the unit injection quantity or one injection unit) into the fuel system of the internal combustion engine upon each actuation thereof. Thus, only when the cumulated oil quantity exceeds the unit injection quantity is it necessary to initiate an injection event. Otherwise, by increasing the cumulated oil quantity by the amount of oil to be injected in the current interval, injection is deferred until such future intervals when the cumulated oil quantity exceeds the unit injection quantity.

Thus, referring back to FIG. 3, if the cumulated oil quantity does not exceed the unit injection quantity, control passes to block 314 where the cumulated oil quantity is recorded for later use. Control then passes to block 316, where the interval timer variable, interval mileage variable, and interval fuel consumption value, are reset to zero in preparation for the next interval loop, and finally control returns to block 304, where the system again enters the interval loop.

If the cumulated oil quantity exceeds the unit injection quantity in block 312, then control passes to block 318 where an injection event is initiated. Specifically, in block 318, a solenoid control signal is generated by the oil replacement controller 18 and supplied to lube oil injection control device 16 (shown in FIG. 1) to initiate the injection of one injection unit of oil, for example, one ounce.

Control then passes to block 320, where the cumulated oil quantity is reset to zero. That is, in view of the injection event occurring in block 318 as a result of the cumulated oil quantity exceeding the unit injection quantity, the cumulated oil quantity is reset to zero to allow for the quantity of oil to be injected in future intervals to be similarly accumulated. Of course, one of skill in the art will appreciate that the cumulated oil quantity could be reduced only by the unit injection quantity (instead of being reset to zero) to provide for greater accuracy in the oil replacement system of the present invention, if necessary. Control then passes to block 316, where the interval timer variable, interval mileage variable, and interval fuel consumption value, are reset to zero, and finally control returns to block 304, where the system again enters the predetermined interval loop.

As noted above, the determination of the quantity of oil to be injected into the fuel system during any given time interval is determined based on the fuel consumption of the internal combustion engine. As the operating conditions of the engine vary, the fuel consumption rate of the engine varies resulting in variations in the quantity of oil to be injected. As the quantity of oil to be injected varies, the timing of oil injection and thus the injection flow rate varies since the time required to produce a unit injection quantity will vary. The process employed in the most preferred embodiment of the present invention to calculate the quantity of oil is illustrated in FIG. 4.

As discussed hereinbelow, the most preferred embodiment of the present invention uses a fuel consumption value as an indication of the engine operating severity since fuel consumption closely correlates to the operating severity of the engine and thus the deterioration of the lube oil. However, other engine operating parameters which correlate to the severity of engine operation may be used, such as engine exhaust air temperature. The engine operating severity value, i.e. preferably an average or total, depending on the parameter, as opposed to an instantaneous value, would be calculated for a current interval of engine operation and used in the process of the present invention in a similar manner as the fuel consumption value. Of course, the correlation of the engine operating severity value to the severity of engine operation and the determination of the oil to be injected would be dependent on the particular severity value used as discussed hereinbelow.

As seen in FIG. 4, the process begins in block 400 where the system determines the internal combustion engine type and configuration based on initial set-up information provided to the oil replacement controller 18. Initial set-up information for a plurality of internal combustion engine types and configurations could be stored, for example, in memory 216 discussed above in connection with FIG. 2 and could be selected based on a DIP switch or jumper connection on the oil replacement controller 18, such as through the use of engine type selection switches 232. Alternatively, the internal combustion engine type and configuration information could itself be provided by an external DIP switch, jumper block, or the like.

The configuration information could include, for example, the specific fuel system in use on the internal combustion engine and any other suitable information impacting the fuel consumption of the engine. For each combination of engine type and configuration information, the system includes a data table of oil change periods corresponding to respective fuel consumption values of the internal combustion engine.

Control then transfers to block 402, where the fuel consumption value of the internal combustion engine is used as an index to the data table corresponding to the engine type and configuration information, to thus access an oil change period corresponding to the current operational state of the internal combustion engine. Thus, for any given fuel consumption value as determined for the current interval, a current oil change period for the type and configuration of the engine is determined. Control then passes to block 404 where the current oil change period is divided into the oil capacity of the internal combustion engine to determine a baseline quantity of oil to be injected into the fuel system of the internal combustion engine.

For example, for an engine currently having a fuel consumption value of 7 miles-per-gallon, an oil change period of 25,000 miles is determined from the appropriate data table in block 402. If the engine has an oil sump capacity of 11 gallons, then the baseline quantity of oil to be injected is equal to 11 gallons divided by 25,000 miles, or approximately 0.06 ounces-per-mile. If, however, the same engine is operating at a fuel consumption value of 5 miles-per-gallon, the oil change period is determined in block 402 to be 12,000 miles. Thus, the baseline quantity of oil to be injected is equal to 11 gallons divided by 12,000 miles, or approximately 0.12 ounces-per-mile.

As discussed hereinabove, an alternative embodiment may use an engine operating severity value other than fuel consumption, such as engine exhaust air temperature and lube oil soot contamination levels. In this case, the oil change period would be accessed in block 402 using a specific data table correlating the particular engine operating severity value to the oil change period.

Control next transfers to block 406, where the baseline quantity is adjusted by the oil temperature. In the most preferred embodiment, if the oil temperature is over 255° F., the baseline quantity will be increased by as much as 50%, generally in proportional relationship to the amount by which the oil temperature exceeds 255° F.

In blocks 408 and 410, the system next adjusts the baseline quantity based on the soot producing characteristics of the internal combustion engine operating at the specific fuel consumption value. Thus, in block 408, the system first reads a soot data table to determine the soot rate of the engine for the current interval fuel consumption value and fuel quality. This value is used in block 410 to adjust the baseline quantity of oil to be injected such that a higher soot rate results in an increase in the baseline quantity of oil to be injected, while a lower soot rate results in a decrease in the baseline quantity of oil to be injected.

In accordance with the most preferred embodiment of the present invention, the baseline quantity of oil to be injected can optionally be further adjusted in accordance with a number of factors, if desired. Specifically, in block 412 for example, the baseline quantity can be adjusted based on the quality of the oil used in the internal combustion engine. Thus, if the engine is using a higher quality oil having a longer life span, then the amount of oil to be disposed through injection into the fuel could be reduced. Conversely, if a lower grade oil is used, the amount to be injected could be increased accordingly. Also, although not shown in FIG. 4, adjustments could be made to the baseline quantity based on the sulfur content of the fuel. Upon completion of the process illustrated in FIG. 4, control returns at block 414 to block 312 shown in FIG. 3.

A second embodiment of the process for calculating the quantity of oil to be injected for a particular interval is illustrated in FIG. 5. In this embodiment, the quantity oil to be injected is based on a desired oil concentration value. The oil concentration value which may vary depending on the engine type and configuration. The process begins in block 500 where the system determines the internal combustion engine type and configuration based on initial set-up information provided to the oil replacement controller 18. As with the previous embodiment of FIG. 4, initial set-up information for a plurality of internal combustion engine types and configurations could be stored, for example, in memory 216 discussed above in connection with FIG. 2 and could be selected based on a DIP switch or jumper connection on the oil replacement controller 18, such as through the use of engine type selection switches 232. Alternatively, the internal combustion engine type and configuration information could itself be provided by an external DIP switch, jumper block, or the like. The configuration information could include, for example, the specific fuel system in use on the internal combustion engine and any other suitable information impacting the fuel consumption of the engine.

Control then transfers to block 502, where the specific engine type and configuration of the internal combustion engine is used as an index to a data table to access an oil concentration value. Control then passes to block 504 where the oil concentration value is multiplied by the current fuel consumption value or rate of the internal combustion engine to determine a baseline quantity of oil to be injected into the fuel system of the internal combustion engine. For example, for a given engine type and configuration, an oil concentration value of 0.03% may be accessed in block 502 and multiplied by the current fuel consumption value of, for example, 7 miles-per-gallon to obtain the current baseline quantity of oil to be injected.

Control next transfers sequentially to blocks 506, 508, 510 and 512 where the baseline quantity is adjusted based on the oil temperature, the soot producing rate of the fuel and the quality of the lube oil, as discussed with respect to the preferred embodiment of FIG. 4. Upon completion of the process illustrated in FIG. 5, control returns at block 514 to block 312 shown in FIG. 3.

Referring next to FIG. 5, a second important aspect of the present invention in which a diagnostic process is performed to monitor the oil sump level, to transfer oil from auxiliary oil tank 40 to primary oil sump 24 if necessary, and to alert an operator to a fault condition in the oil replacement system of the present invention will now be discussed in detail. As seen in FIG. 5, the most preferred embodiment of the diagnostic process begins at block 600 when an internal combustion engine containing an oil replacement system in accordance with the present invention is started. Upon starting of the internal combustion engine, the controller 18 containing the diagnostic process will be initialized and the control program contained therein executed, beginning in block 602.

In block 602, the diagnostic process first reads the oil sump level sensor to determine the oil level in primary oil sump 24. Having determined this level, the process transfers control to decisional block 604, where the process determines if the primary oil sump level is either high or low. If the oil level is neither high nor low, control returns to block 602 to form an oil sump level monitoring loop.

If it is determined in decisional block 604 that the oil level is high, control transfers to decisional block 606, where it is determined if the solenoid associated with auxiliary oil flow control device 44 is functional. That is, as described above in connection with FIG. 1, the solenoid of auxiliary oil flow control device 44 can be actuated to allow oil from auxiliary oil tank 40 to be supplied to primary oil sump 24. However, should the solenoid of device 44 be defective or stuck in an open condition, it could result in overfilling of the primary oil sump 24. Therefore, in accordance with the most preferred embodiment of the diagnostic process shown in FIG. 5, if the primary oil sump level is high, the diagnostic process verifies proper operation of the solenoid associated with control device 44 to ensure that the excess oil in primary oil sump 24 is not the result of the solenoid of control device 44 being defective.

If it is determined that the solenoid of auxiliary oil flow control device 44 is not functional, then control transfers to block 608 where a fault code is generated to the vehicle operator indicating that the solenoid/control device 44 may be malfunctioning and that a manual shutdown procedure may be necessary. If it is determined that control device 44 is functioning properly, then control returns to block 602 to continue monitoring the oil level in primary oil sump 24.

If in decisional block 604 it is determined that the oil level in the primary oil sump is low, control transfers to block 610, where the diagnostic system generates a signal commanding oil injection from the auxiliary oil tank to primary oil sump 24. That is, as a result of the determination that the primary oil sump level is low, the diagnostic system adds oil from auxiliary tank 40 to primary sump 24.

Control then transfers to decisional block 612, where the process determines if the primary oil sump level is medium. If the oil level is medium, then the oil addition performed in block 610 was sufficient to replenish primary oil sump 24 and control transfers to block 606 to verify that the solenoid of auxiliary oil control device 44 is functioning properly. If the oil level is not medium, then the oil addition performed in block 610 was insufficient to replenish the primary oil sump, and control transfers to decisional block 614.

In decisional block 614, the diagnostic process determines if the auxiliary oil tank level sensor is low. That is, the diagnostic process reads an auxiliary oil tank level sensor and processes the resulting level information to determine if sufficient oil remains in auxiliary oil tank 40. If auxiliary tank 40 does not contain a sufficient amount of oil (i.e. the level is low), then control transfers to block 616 where a fault code is generated alerting the operator of the need to add oil to auxiliary oil tank 40. Control then returns to decisional block 618 discussed hereinbelow. If it is determined in decisional block 614 that the auxiliary oil tank level is not low, the control transfers directly to decisional block 618.

In decisional block 618, the diagnostic process determines if the solenoid of auxiliary flow control device 44 is functional. That is, the diagnostic process makes a similar determination as that made in decisional block 606. In block 618, however, if it is determined that the solenoid is functional, then control returns to block 610, where additional oil is transferred from auxiliary oil tank 40 to primary oil sump 24. This process continues until the primary oil sump level has been adequately replenished.

If, however, it is determined in decisional block 618 that the solenoid of control device 44 is not functional, then control transfers to block 620 where a fault code indicating that oil should be manually added to primary oil sump 24 is generated to the operator of the vehicle. Control then returns to block 610 to continue attempts at transferring oil from auxiliary oil tank 40 to the primary oil sump 24.

Figure 6:
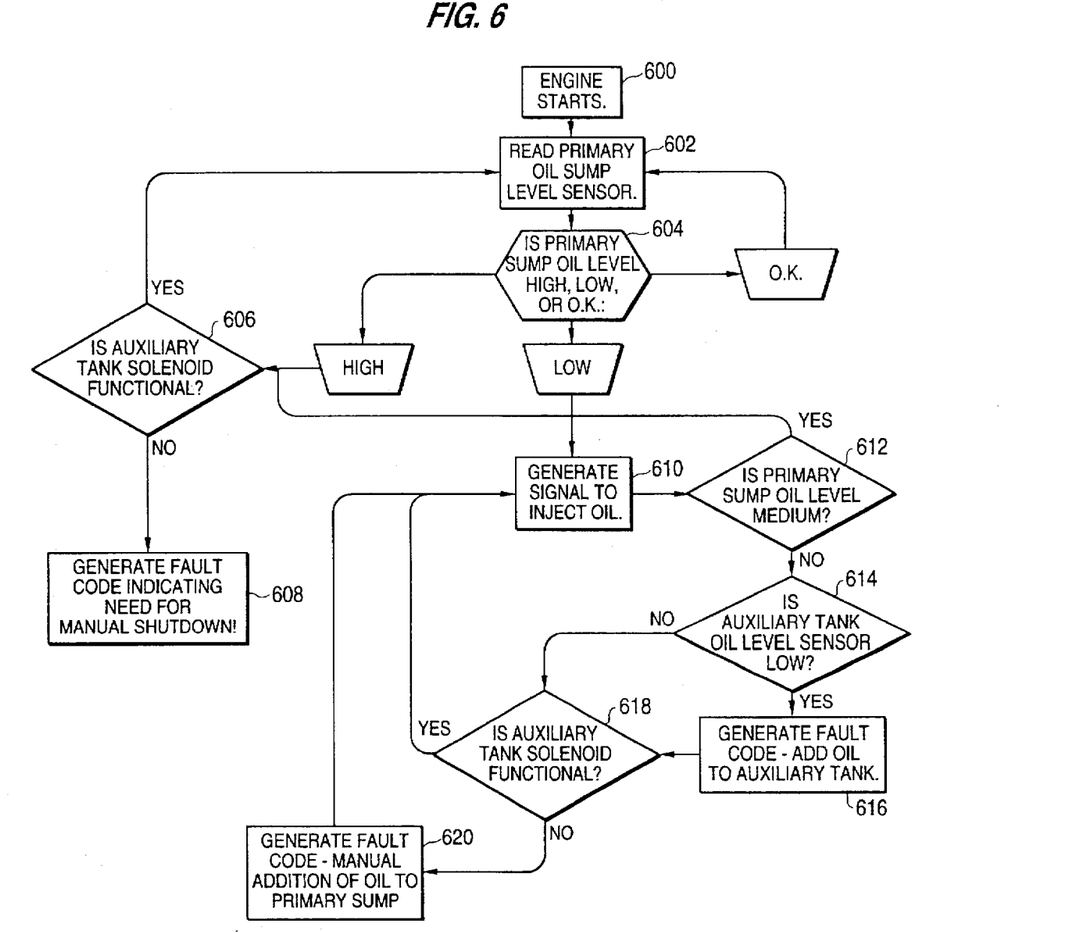
FIG. 6 is a flowchart illustrating a diagnostic process for monitoring the amount of available oil in a lube sump, for replacing such amount from an auxiliary oil tank when necessary and for providing external indications of the condition of the oil replacement system to an operator of a vehicle.

Having described the most preferred embodiment of the diagnostic process of the present invention above in detail, it should be appreciated that various alterations to this system could be made within the scope of the invention. Specifically, if the primary oil sump level sensor only has a "low" output, then the diagnostic process of FIG. 6 could be simplified such that as a result of the low level signal, oil is transferred from auxiliary tank 40 to the primary oil sump 24. Furthermore, it is possible that the vehicle would not be equipped with auxiliary oil tank 40, it which case it would not be possible to replenish oil to primary oil sump 24. In this case, the diagnostic process would merely generate an appropriate dashboard indicator to the vehicle operator indicating the need for oil addition, etc. Finally, the diagnostic process of the present invention will also record the amount of oil being transferred from auxiliary tank 40 to the primary oil sump 24 and compare this value at regular intervals with the fuel consumption value and/or the amount of oil injected into the fuel system of the engine. By making this comparison, the diagnostic process can determine if the replacement rate is higher or lower than the injection rate to detect an oil pan leak or other malfunctioning.

The present lube oil replacement system results in several important advantages. First, the present system maintains the quality of the lube oil in sump 24 at an optimum level throughout engine operation regardless of engine operating conditions. Fundamentally, the present system is capable of automatically and continuously determining the current level of distress or wear imparted upon the oil based on varying engine operating conditions and continuously adjusting the replacement rate to obtain an optimum level of engine lubrication throughout engine operation. This is accomplished by variably controlling the amount of oil drained from the sump and injected into the fuel system based on the severity of engine operation as indicated by, for example, fuel consumption of the engine, and other factors such as engine temperature and oil soot contamination levels. Generally, when the engine operates at above normal capacity and increased load, the fuel consumption rate increases and the rate of oil degradation increases. In response, the present system will increase the frequency of used lube oil injections into the fuel system and accordingly increase the frequency of new lube oil injections from auxiliary tank 40 into sump 24. On the other hand, if the engine begins to operate at a reduced capacity under lighter loads, fuel consumption will decrease resulting in less than normal oil degradation. In response, the present system will decrease the frequency of used lube oil injections into the fuel system and accordingly decrease the frequency of new lube oil injections from auxiliary tank 40 into sump 24. The present system variable controls the frequency of lube oil replacement by controlling the frequency of operation of injection control device 16 and auxiliary lube oil flow control device 44. In comparison, most conventional "preset" continuous lube oil replacement systems do not adequately maintain the quality of the lube oil in the sump. A conventional "preset" continuous lube oil replacement system injects predetermined quantities of lube oil at preset time intervals throughout engine operation. The injection quantity or the frequency of injections is adjustably set to cause replacement of the entire sump according to the regular recommended oil change period for the particular engine regardless of engine operating conditions. If the engine is operated at greater than normal capacity, the conventional system will continue to inject the same quantity of oil over time. As a result, over time, the lube oil will periodically reach levels of high degradation causing increased engine wear. This comparative advantage of the present invention over conventional "preset" systems is shown by Example I and Table I.

EXAMPLE I

Each engine is an M11 engine, manufactured by the assignee of the present invention, Cummins Engine Co., Inc., having a 100 gallon fuel tank and an 11 gallon oil sump. The engine pumps 40 gallons per hour of fuel through the fuel system continuously. When operating at full power, this engine will burn approximately 16 gallons per hour with the remaining returning to the fuel tank. When operating at nearly no load, the engine will burn 4 gallons of fuel per hour. The fuel is a low sulfur fuel with 0.045% sulfur and the lubricant contains 0.45% sulfur.

Engine A includes a conventional "preset" injection system with a preset injection rate of lube oil into the fuel system based on no load conditions. Engine B includes the present continuous lube oil replacement system. The engines are operated at full power, i.e. under full load conditions, for the recommended oil change period of 12,000 miles for full power operation. As shown in Table I, the conventional system in engine A fails to respond to the need for increased oil replacement under the heavier operating conditions of the engine by only replacing 2.7 gallons under full power conditions. As a result, the lube oil in the engine's lube oil system becomes over-used causing increased engine wear. The present system, on the other hand, replaces 11.4 gallons of oil thus providing optimal engine protection.

TABLE I

| | Oil replaced in 12,000 miles (gallons) | Oil concentration in fuel (%) | Fuel sulfur content including used oil (%) |
|---|---|---|---|
| Engine A - Conventional "preset" system | 2.70 | 0.2 | 0.045 |
| Engine B - Present system | 11.4 | 0.8 | 0.047 |

Also, by frequently adjusting the rate of oil replacement to inject only the required amount of oil according to engine fuel consumption, the present system avoids wasting oil. Conventional "preset" lube oil replacement systems, which are preset to inject oil at a rate corresponding to normal or high engine operating capacity, will continue to inject more oil than necessary resulting in unnecessary costs to the operator. Example II and Table II set forth this comparative advantage of the present invention over conventional "preset" systems.

EXAMPLE II

The type of engine, fuel and lubricant is the same as described in Example I hereinabove. Also, engine A includes a conventional "preset" injection system while engine B includes the present continuous lube oil replacement system. However, engine A is now preset with a lube oil injection rate based on full engine power operation and the engines are operated at no load. Since the oil change recommendation at full power is 11 gallons every 12,000 miles, the oil change recommendation at no load will be significantly less the 11 gallons every 12,000 miles. However, as shown in Table II, the amount of oil replaced in engine A at 12,000 miles even exceeds the full power recommendation. Thus, it is shown that the conventional "preset" system unnecessarily injects, and therefore wastes, approximately 14 gallons of oil. The present system, on the other hand, automatically compensates for the decreased load by injecting less oil into the fuel system.

TABLE II

| | Oil replaced in 12,000 miles (gallons) | Oil concentration in fuel (%) | Fuel sulfur content including used oil (%) |
|---|---|---|---|
| Engine A - Conventional "preset" system | 20.3 | 1.70 | 0.052 |
| Engine B - Present system | 6.24 | 0.56 | 0.047 |

Another advantage of the present invention is the ability to maintain the lube oil concentration in the fuel below a level necessary to maintain the sulfur content of the fuel below the acceptable limit of 0.05%. It has been found that, for the typical oil, the lube oil concentration in the fuel should be less than 1% at all times during engine operation and preferably approximately 0.5% to maintain the sulfur content of a typical low sulfur fuel below 0.05%. Conventional systems are less capable of maintaining the sulfur content below 0.05% since at certain engine operating conditions more oil will be injected into the fuel system than is necessary. The likelihood of conventional systems resulting in unacceptably high sulfur levels in the fuel is especially high when the engine is operating at a capacity less than the capacity corresponding to the preset injection rate. As shown in Example II and Table II, the conventional "preset" system may inject an excessive amount of lube oil into the fuel causing the cumulative sulfur content of the oil and fuel to exceed the acceptable limit of 0.05%. Excessive oil concentrations may also adversely affect the engine emissions resulting in emissions noncompliance. The present system maintains the sulfur concentration within acceptable limits by varying the injection rate based on engine conditions and is also more likely to maintain emissions within regulatory limits throughout operation of the engine. As shown in Table I, although the present system injects more oil to provide optimal engine protection at higher engine loads, the fuel sulfur content and oil concentration are maintained within acceptable limits.

INDUSTRIAL APPLICABILITY

The present continuous lube oil replacement system may be used in any internal combustion engine having a supply of lubricating fluid for lubricating the engine's components. However, the present system is particularly useful in a compression ignition engine of any vehicle, such as a truck or boat, or industrial equipment, such as construction or earth moving machines.

We claim:

1. An electronically controlled continuous lube oil replacement system for an engine having a fuel supply system for supplying fuel to the engine, comprising:

engine lube oil supply means including a lube oil supply circuit for delivering a supply of lube oil to the engine;

a lube oil injection circuit connected to said lube oil supply circuit and the fuel supply system for permitting an injection flow of lube oil from said lube oil supply circuit to said fuel supply system for injecting lube oil into said fuel supply system for mixing with the fuel;

an engine lube oil injection control means positioned along said lube oil injection circuit for controlling said injection flow of lube oil to define a lube oil injection rate;

engine operating condition detecting means for detecting at least one engine operating condition and generating an engine operating condition signal indicative of said at least one engine operating condition;

processing means for receiving said engine operating condition signal, calculating an engine operating severity value based on said engine condition signal and generating an injection flow control signal based on said engine operating severity value, said injection flow control signal controlling the operation of said lube oil injection control means to variably control said injection rate; and an auxiliary lube oil supply means including an auxiliary lube oil supply circuit for providing an auxiliary supply flow of lube oil to said main lube oil supply means and an auxiliary lube oil tank containing a supply of auxiliary lube oil, further including an auxiliary lube oil flow control means positioned along said auxiliary lube oil supply circuit for controlling said auxiliary supply flow of lube oil to said engine lube oil supply means to define an auxiliary supply flow rate, said processing means generating a flow control signal for controlling the operation of said auxiliary lube oil flow control means to variably control said auxiliary supply flow rate.

2. The continuous lube oil replacement system of claim 1, wherein said engine lube oil supply means includes a lube oil sump containing an accumulated supply of lube oil, said auxiliary lube oil supply circuit connecting said auxiliary lube oil tank to said lube oil sump for delivering said auxiliary supply flow to said sump, further including a lube oil sump level sensor for detecting a sump oil level in said sump and generating a corresponding level signal, said processing means receiving said level signal and generating said auxiliary control signal based on said level signal for controlling the operation of said auxiliary supply flow control means to maintain said sump oil level at an acceptable level.

3. The continuous lube oil replacement system of claim 1, wherein said engine lube oil injection control means includes an injection pump intermittently operated to pump a controlled predetermined quantity of lube oil into said fuel supply system, and said auxiliary lube oil flow control means includes an injection pump intermittently operated to pump a controlled predetermined quantity of auxiliary lube oil into said sump.

4. The continuous lube oil replacement system of claim 1, further including an electronic control module for controlling engine operation, said electronic control module providing said engine condition signal to said processing means.

5. The continuous lube oil replacement system of claim 1, wherein said engine operating severity value is a fuel consumption value corresponding to a fuel consumption of the engine during an operating interval.

6. An electronic controller for controlling oil replacement in an internal combustion engine having a lube oil system and a fuel system, comprising:

input means for receiving an engine condition signal indicative of an operating condition of the engine;

output means for providing an output signal from the electronic controller to a flow control device for controlling a flow of lube oil;

a soot information storage means for storing soot information;

processing means connected with said input means and said output means for receiving said engine condition signal, for calculating an engine operating severity value based on said engine condition signal, for processing said engine operating severity value to determine a quantity of oil to be injected, for generating an output signal based on said quantity of oil to be injected and for providing said output signal to said output means, said processing means accessing said soot information storage means to retrieve a soot value and adjusting said quantity of oil to be injected based on said soot value.

7. The electronic controller of claim 6, wherein said engine operating severity value is a fuel consumption value corresponding to a fuel consumption of the engine during an operating interval.

8. The electronic controller of claim 6, wherein said input means receives a temperature signal indicative of engine lube oil temperature and said processing means adjusts said quantity of oil to be injected based on said temperature signal.

9. The electronic controller of claim 6, wherein said control processing means adjusts said quantity of oil to be injected based on a quality characteristic of the lube oil.

10. The electronic controller of claim 6, further including an engine configuration storage means connected with said processing means for storing engine configuration information for multiple engines.

11. The electronic controller of claim 10, wherein said processing means processes said fuel consumption value by accessing said engine configuration storage means and retrieving an oil change value corresponding to said quantity of oil to be injected into the fuel system based on said fuel consumption value.

12. The electronic controller of claim 6, wherein the engine includes an electronic control module for controlling engine operation and providing said engine condition signal to said processing means.

13. A method for controlling lube oil replacement in an internal combustion engine having a lube oil system and a fuel system, comprising the steps of:

receiving a first signal indicative of an operating condition of the engine;

calculating an engine operating severity value based on said first signal;

processing said engine operating severity value to determine a quantity of oil to be injected based on said engine operating severity value;

summing said quantity of oil to be injected for a plurality of periodic intervals to define a cumulated oil quantity to be injected:

comparing said cumulated quantity of oil to be injected to said predetermined unit injection quantity;

generating an output signal based on said cumulated quantity of oil; and providing said output signal to a flow control device for controlling a flow of lube oil from the engine lube system into the fuel system, said quantity of oil to be injected being determined at periodic intervals throughout engines operation and said flow control device being capable of injecting a predetermined unit injection quantity upon receipt of said output signal.

14. The method of claim 13, further including the step of accessing engine configuration information for at least one engine in an engine configuration storage means to retrieve an oil change value corresponding to said quantity of oil to be injected into the fuel system based on said engine operating severity value.

15. The method of claim 13, wherein said engine operating severity value is a fuel consumption value corresponding to a fuel consumption of the engine during an operating interval.

16. The method of claim 13, wherein said periodic intervals are based on a time variable.

17. The method of claim 13, wherein said periodic intervals are based on a mileage variable.

18. The method of claim 13, wherein the timing of the injection of said predetermined unit injection quantity during engine operation is dependent on said engine operating severity value.

19. The method of claim 13, wherein said output signal is provided to said injection control device when said cumulated oil quantity to be injected is greater than said predetermined unit injection quantity.

20. The method of claim 13, further including the steps of detecting oil temperature, generating a temperature signal indicative of said oil temperature, and adjusting said quantity of oil to be injected based on said temperature signal.

21. The method of claim 20, further including the steps of accessing soot information from a soot information storage means to retrieve a soot value and adjusting said quantity of oil to be injected based on said soot value.

22. The method of claim 21, further including the step of adjusting said quantity of oil to be injected based on a quality characteristic of the lube oil.

23. The method of claim 13, further including the steps of determining an engine sump oil level and providing a first control signal to an auxiliary flow control device to inject a first quantity of auxiliary oil from an auxiliary lube oil tank to an engine sump when said engine sump oil level is below an acceptable level.

24. The method of claim 23, further including the step of redetermining said engine sump oil level after injection of said first quantity of auxiliary oil, determining an auxiliary oil level in said auxiliary oil tank when said engine sump level is unacceptable and generating a fault signal for alerting an operator when the auxiliary oil tank level is low.

25. The method of claim 23, further including the steps of determining whether said auxiliary flow control device is functioning properly when said engine sump oil level is higher than an acceptable level and generating a fault signal for alerting an operator when said auxiliary flow control device is functioning improperly.

26. The method of claim 24, further including the steps of determining whether said auxiliary flow control device is functioning properly after determining said auxiliary oil level in said auxiliary oil tank and generating a fault signal for alerting an operator when said auxiliary flow control device is functioning improperly.

27. An electronic controller for controlling oil replacement in an internal combustion engine having a lube oil system and a fuel system, comprising:

input means for receiving an engine condition signal indicative of an operating condition of the engine;

output means for providing an output signal from the electronic controller to a flow control device for controlling a flow of lube oil;

processing means connected with said input means and said output means for receiving said engine condition signal, for calculating an engine operating severity value based on said engine condition signal, for processing said engine operating severity value to determine a quantity of oil to be injected, for generating an output signal based on said quantity of oil to be injected and for providing said output signal to said output means;

an engine configuration storage means connected with said processing means for storing engine configuration information for multiple engines.

28. A method for controlling lube oil replacement in an internal combustion engine having a lube oil system and a fuel system, comprising the steps of:

receiving a first signal indicative of an operating condition of the engine;

calculating an engine operating severity value based on said first signal;

processing said engine operating severity value to determine a quantity of oil to be injected based on said engine operating severity value;

generating an output signal based on said quantity of oil;

accessing soot information from a soot information storage means to retrieve a soot value and adjusting said quantity of oil to be injected based on said soot value; and providing said output signal to a flow control device for controlling a flow of lube oil from the engine lube system into the fuel system.

29. A method for controlling lube oil replacement in an internal combustion engine having a lube oil system and a fuel system, comprising the steps of:

receiving a first signal indicative of an operating condition of the engine;

calculating an engine operating severity value based on said first signal;

processing said engine operating severity value to determine a quantity of oil to be injected based on said engine operating severity value;

generating an output signal based on said quantity of oil;

providing said output signal to a flow control device for controlling a flow of lube oil from the engine lube system into the fuel system; and determining an engine sump oil level and providing a first control signal to an auxiliary flow control device to inject a first quantity of auxiliary oil from an auxiliary lube oil tank to an engine sump when said engine sump oil level is below an acceptable level.

30. The method of claim 29, further including the step of redetermining said engine sump oil level after injection of said first quantity of auxiliary oil, determining an auxiliary oil level in said auxiliary oil tank when said engine sump level is unacceptable and generating a fault signal for alerting an operator when the auxiliary oil tank level is low.

31. The method of claim 29, further including the steps of determining whether said auxiliary flow control device is functioning properly when said engine sump oil level is higher than an acceptable level and generating a fault signal for alerting an operator when said auxiliary flow control device is functioning improperly.

32. The method of claim 30, further including the steps of determining whether said auxiliary flow control device is functioning properly after determining said auxiliary oil level in said auxiliary oil tank and generating a fault signal for alerting an operator when said auxiliary flow control device is functioning improperly.

* * * * *